United States Patent
Johansson et al.

(10) Patent No.: US 12,323,806 B2
(45) Date of Patent: Jun. 3, 2025

(54) METHODS, NETWORK NODE AND WIRELESS DEVICE FOR VERIFICATION OF BROADCAST MESSAGES

(71) Applicant: Telefonaktiebolaget LM Ericsson (publ), Stockholm (SE)

(72) Inventors: Nicklas Johansson, Linköping (SE); Martin Hessler, Linköping (SE); Pål Frenger, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 569 days.

(21) Appl. No.: 17/422,290

(22) PCT Filed: Dec. 18, 2019

(86) PCT No.: PCT/SE2019/051310
§ 371 (c)(1),
(2) Date: Jul. 12, 2021

(87) PCT Pub. No.: WO2020/149776
PCT Pub. Date: Jul. 23, 2020

(65) Prior Publication Data
US 2022/0086644 A1    Mar. 17, 2022

Related U.S. Application Data

(60) Provisional application No. 62/792,926, filed on Jan. 16, 2019.

(51) Int. Cl.
*H04W 12/122* (2021.01)
*H04L 9/32* (2006.01)
(Continued)

(52) U.S. Cl.
CPC ......... *H04W 12/122* (2021.01); *H04L 9/3247* (2013.01); *H04W 12/0431* (2021.01); *H04W 12/106* (2021.01); *H04L 2209/80* (2013.01)

(58) Field of Classification Search
CPC ............ H04W 12/122; H04W 12/106; H04W 12/0431; H04L 9/3247; H04L 2209/80
(Continued)

(56) References Cited

U.S. PATENT DOCUMENTS 8,509,102 B2 * 8/2013 Krishnamurthy ..... H04W 64/00
370/332
9,699,758 B2 * 7/2017 Edge ..................... H04W 64/00
(Continued)

FOREIGN PATENT DOCUMENTS

| EP | 2117200 A1 | 11/2009 |
|---|---|---|
| EP | 2360888 A1 | 8/2011 |
| GB | 2404126 A | 1/2006 |

OTHER PUBLICATIONS

EPO Communication with Supplementary European Search Report dated Sep. 15, 2022 for Patent Application No. 19910654.3, consisting of 11-pages.
(Continued)

*Primary Examiner* — Philip J Chea
*Assistant Examiner* — Ghizlane Maazouz
(74) *Attorney, Agent, or Firm* — Weisberg I.P. Law, P.A.

(57) ABSTRACT

Embodiments herein relate to a method performed by a network node for enabling verification of a broadcast message transmitted from the network node to a wireless device. The network node signals a first public key, to the wireless device, using a secure connection. The network node further transmits a first broadcast message protected by a signature. The signature is generated from at least a protected part of the first broadcast message using a first private key, the first private key being associated with the first public key. Thereby, the broadcast message can be verified by the
(Continued)

wireless device using the distributed first public key, thus preventing fake broadcast messages to be accepted by the device.

5 Claims, 15 Drawing Sheets

(51) Int. Cl.
  *H04W 12/0431* (2021.01)
  *H04W 12/106* (2021.01)
(58) Field of Classification Search
  USPC .......................................................... 726/26
  See application file for complete search history.

(56) References Cited

U.S. PATENT DOCUMENTS

| | | | | |
|---|---|---|---|---|
| 9,860,067 | B2* | 1/2018 | Piqueras Jover | H04L 9/3247 |
| 10,149,159 | B1* | 12/2018 | Perfitt | H04L 9/3265 |
| 10,805,784 | B2* | 10/2020 | Edge | H04L 12/1886 |
| 2003/0078061 | A1* | 4/2003 | Kim | H04N 21/6131 |
| | | | | 348/E7.071 |
| 2004/0082344 | A1* | 4/2004 | Moilanen | H04W 64/00 |
| | | | | 455/456.3 |
| 2015/0119066 | A1* | 4/2015 | Chiou | H04W 24/08 |
| | | | | 455/456.1 |
| 2017/0126411 | A1* | 5/2017 | Piqueras Jover | H04L 9/3247 |
| 2017/0295489 | A1* | 10/2017 | Agiwal | H04W 12/0433 |
| 2018/0124697 | A1* | 5/2018 | Nair | H04W 12/122 |
| 2018/0146332 | A1* | 5/2018 | Opshaug | G01S 5/10 |
| 2018/0367303 | A1* | 12/2018 | Velev | H04L 9/3297 |
| 2019/0141524 | A1* | 5/2019 | Wang | H04L 9/3247 |
| 2022/0060901 | A1* | 2/2022 | Rajendran | H04W 24/10 |

OTHER PUBLICATIONS

International Search Report and Written Opinion dated Mar. 6, 2020 for International Application No. PCT/SE2019/051310 filed Dec. 18, 2019, consisting of 11-pages.
3GPP TSG-SA Meeting #81 SP-180690; Title: New Study on 5G security enhancement against false base stations; Agenda Item: 19; Source: SA WG3; Document for: Approval; Date and Location: Sep. 12-14, 2018, Gold Coast, Australia, consisting of 3-pages.

* cited by examiner

Transmitter:

Receiver:

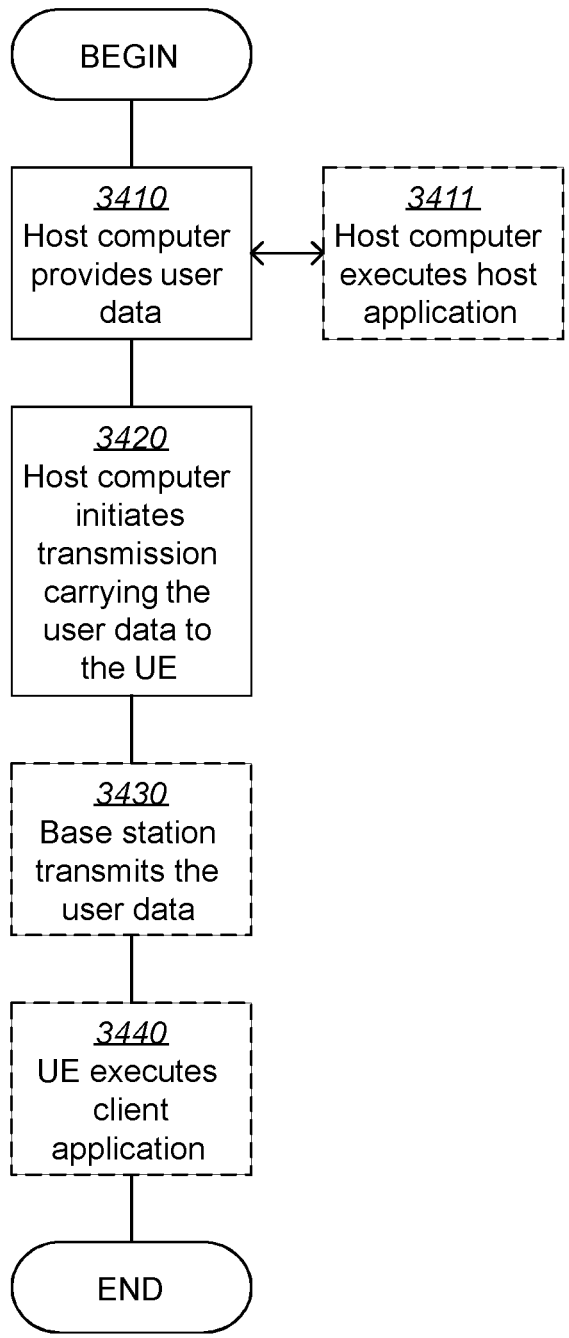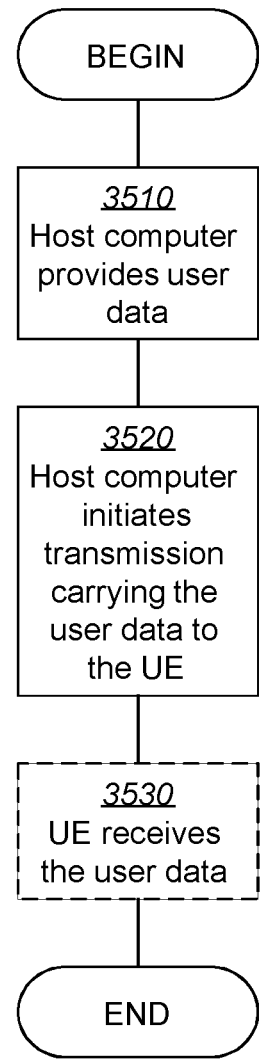
FIG. 13
FIG. 14

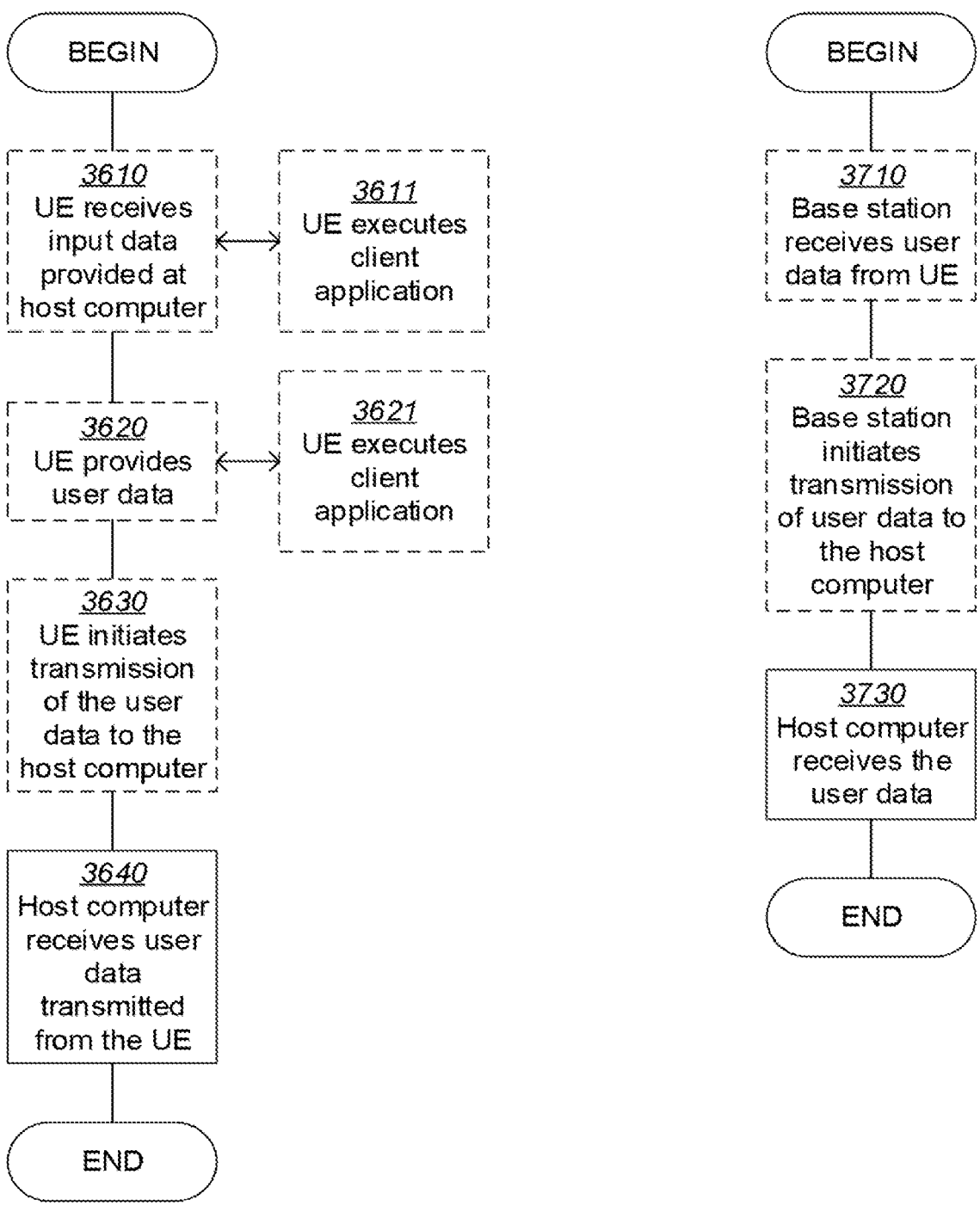

METHODS, NETWORK NODE AND WIRELESS DEVICE FOR VERIFICATION OF BROADCAST MESSAGES

CROSS-REFERENCE TO RELATED APPLICATIONS

This application is a Submission Under 35 U.S.C. § 371 for U.S. National Stage Patent Application of International Application No.: PCT/SE2019/051310, filed Dec. 18, 2019 entitled "METHODS, NETWORK NODE AND WIRELESS DEVICE FOR VERIFICATION OF BROADCAST MESSAGES," which claims priority to U. S. Provisional Application No.: 62/792926, filed Jan. 16, 2019, the entireties of both of which are incorporated herein by reference.

TECHNICAL FIELD

The present disclosure relates generally to a network node, a wireless device and methods therein, for verification of a broadcast message transmitted from the network node to the wireless device.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is sometimes used herein as a synonym for wireless device.

Further, the term "network node", is used herein to represent any node of a wireless network that is operative to communicate signals and messages with wireless devices. The network node in this disclosure may include a base station, radio node, Node B, base transceiver station, access point, etc., although this disclosure is not limited to these examples. The network node in this disclosure may also include a communication control node in the wireless network, such as a Radio Network Controller, RNC, or a core network node, that controls one or more base stations or radio nodes that communicate radio signals with wireless devices.

In this description, a wireless communication network is sometimes also referred to as a wireless system or system for short, which terms are thus used interchangeably. Further, a wireless device is sometimes also referred to as a UE or a user.

In a wireless network, there is a risk that a message received by a UE may not come from its legitimate network, such as when a faked communication node pretending to be a base station transmits a downlink message providing the UE with false information so that the UE is prevented from acting properly. For example, the UE may be tricked to misbehave in some manner with the aim of creating harm and disorder. It is therefore desirable to make sure whether a received message is legitimate or not.

SUMMARY

An object of embodiments herein is to provide a mechanism that handles communication in a wireless network in a more efficient manner.

According to an aspect the object is achieved by providing a method performed by a network node for enabling verification of a broadcast message transmitted from the network node to a wireless device. The network node and the wireless device operate in a wireless communication network. The network node signals a first public key to the wireless device using a secure connection. The network node then transmits a first broadcast message protected by a signature, wherein the signature is generated from at least a protected part of the first broadcast message using a first private key. The first private key is associated with the first public key.

According to another aspect the object is achieved by providing a method performed by a wireless device for verifying a broadcast message transmitted from a network node to the wireless device. The network node and wireless device operate in a wireless communication network. The wireless device obtains a first public key, signaled from the network node using a secure connection. The wireless device receives, from the network node, a first broadcast message protected by a signature. The signature is generated from at least a protected part of the first broadcast message using a first private key. The first private key is associated with the first public key. The wireless device then verifies the first broadcast message using the first public key.

According to yet another aspect the method is achieved by providing a network node for enabling verification of a broadcast message transmitted from the network node to a wireless device. The network node and wireless device are operable in a wireless communication network. The network node is configured to signal a first public key to the wireless device using a secure connection. The network node is further configured to transmit a first broadcast message protected by a signature, wherein the signature is adapted to be generated from at least a protected part of the first broadcast message using a first private key. The first private key is associated with the first public key.

According to a further aspect the object is achieved by providing a wireless device for verifying a broadcast message transmitted from a network node to the wireless device. The network node and wireless device are operable in a wireless communication network. The wireless device is configured to obtain a first public key, signaled from the network node using a secure connection. The wireless device is further configured to receive, from the network node, a first broadcast message protected by a signature. The signature is adapted to be generated from at least a protected part of the first broadcast message using a first private key. The first private key is associated with the first public key. The wireless device is further configured to verify the first broadcast message using the first public key.

BRIEF DESCRIPTION OF THE DRAWINGS

Examples of embodiments herein are described in more detail with reference to attached drawings in which:

FIG. 13 is a flowchart depicting methods implemented in a communication system including a host computer, a base station and a user equipment in accordance with some embodiments;

FIG. 14 is a flowchart depicting methods implemented in a communication system including a host computer, a base station and a user equipment in accordance with some embodiments.

FIG. 15 is a flowchart depicting methods implemented in a communication system including a host computer, a base station and a user equipment in accordance with some embodiments.

FIG. 16 is a flowchart depicting methods implemented in a communication system including a host computer, a base station and a user equipment in accordance with some embodiments.

DETAILED DESCRIPTION

Currently, within 3GPP there are some useful mechanisms for maintaining security in a wireless communication network based upon a shared secret between the network and a UE. The security system may be based upon physically distributing a sim-card to the end-users which may be used in the UE to establish a secure connection and identify the UE. The security mechanism may thus be situated in the core network of the wireless communication network and may provide good security for all active mode communication where the UE actually is communicating with the core network.

For idle mode operation security may be important as the UE may need to rely on the broadcast messages transmitted to maintain tracking of the network nodes etc.

Figure 1:
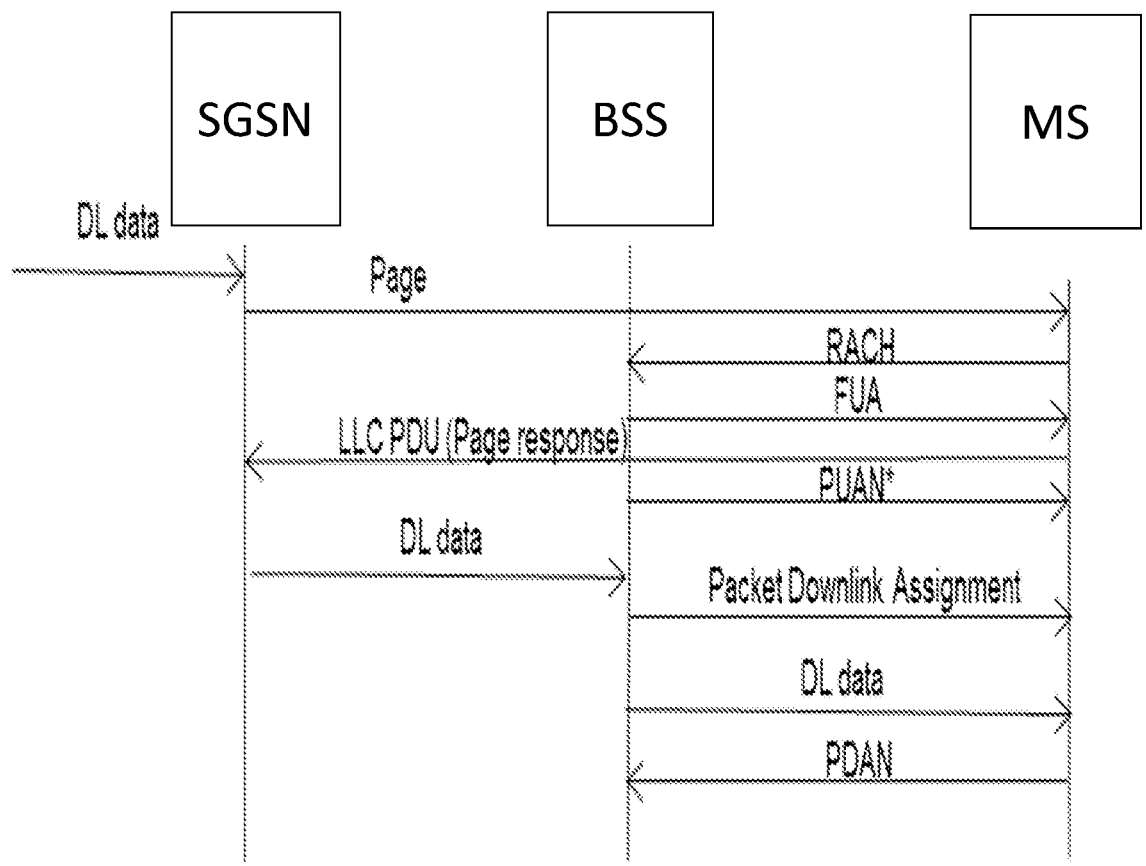
FIG. 1 is a schematic illustration of a signaling flow following a page from a core network according to EC-GSM-IoT.
Figure 2:
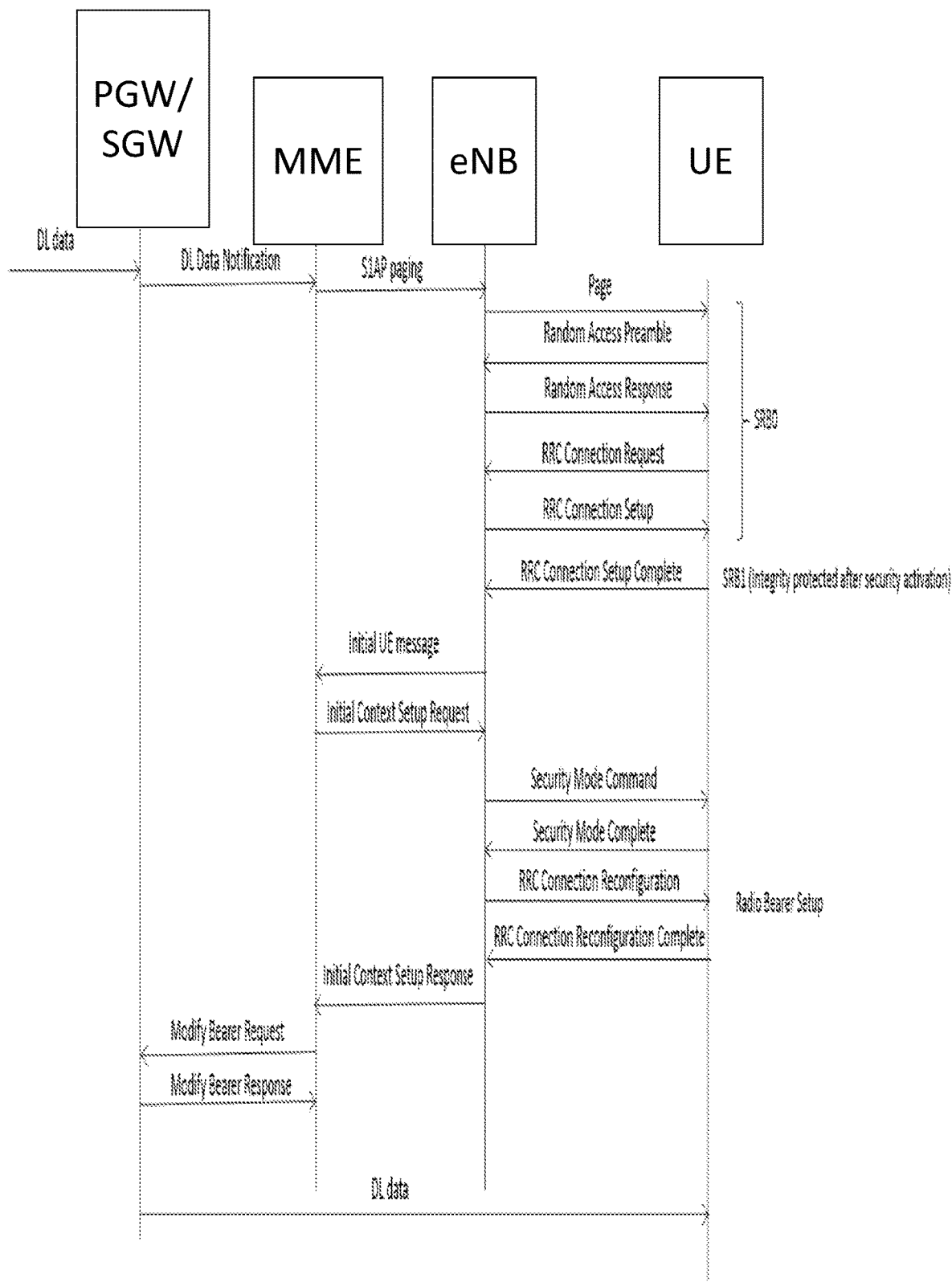
FIG. 2 is a schematic illustration of a signaling flow following a page from a core network according to NB-IoT.

Paging of a UE in the network can be performed when the UE identifies a base station and listens for paging messages transmitted from the base station and originating from a core network node. Thus if the device is addressed in a paging message, the device then sends a page response to the core network node which then allows the core network node to deliver downlink data that e.g. may include a trigger causing the device to perform a certain action such as sending of a measurement report. FIG. 1 and FIG. 2 illustrate two examples of a signaling flow following a page from a core network according to EC-GSM-IoT and NB-IoT, respectively, where IoT denotes Internet of Things. A problem may occur if fake broadcast messages are sent to the UE e.g. through a fake base station, so that the UE may receive manipulated information or miss true information altogether.

For example, if an attacking party, herein referred to as an attacker for short, wants to stop the UE from receiving paging messages, the attacker may simply make the UE camp on a fake base station, which may either send fake paging messages that do not contain any paging indicator or not send any paging messages at all, to the UE.

In the field of security for communication of data and messages, there are some basic principles that may be used. Encryption is a method where the data D is encrypted and may be decrypted giving a receiver access to the full information in D. Hashing or checksums are methods that may be used for calculating a fixed length message from any message D.

Encryption may be possible to achieve either by using a shared secret i.e. both a transmitter and a receiver have knowledge that enables these to encrypt/decrypt messages, or using a private key and an associated public key where the private key is kept secret while the public key may be distributed to a group of users. Private and public key methods may be used both to enable the owner of the private key to encrypt messages that then may be decrypted by anyone in possession of the associated public key. Such keys may also be used to enable anyone in possession of the public key to encrypt messages that can only be read by someone in possession of the corresponding private key.

Figure 3:
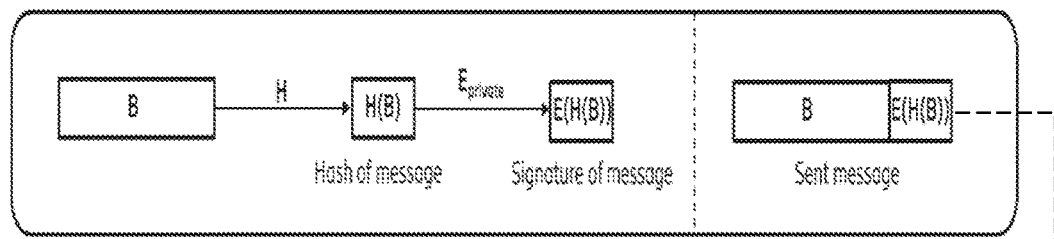
FIG. 3 is a schematic block diagram illustrating a combination of a public/private key encryption and a shared hash function.
Figure 3:
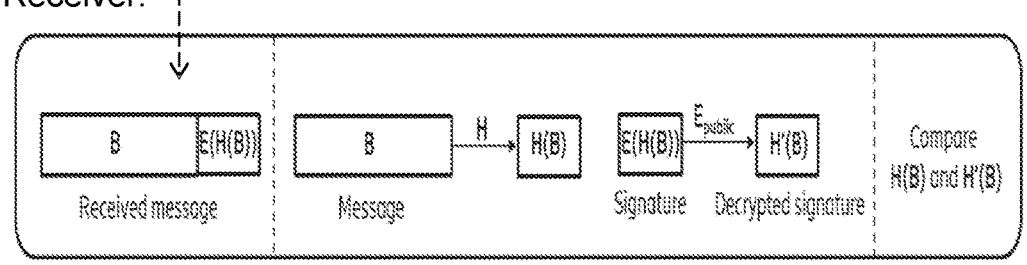

Signature is a method to use a combination of the public/private key encryption and a shared (possibly secret) hash function. Different options of using the signature method are depicted in FIG. 3.

One significant issue when it comes to protection against fake base stations or the like is how to handle so called replay attacks. In a replay attack the attacker records messages from a legitimate base station and replays them through the fake base station at a later instance of time. Replay attacks may be performed on different time scales either using periodicities in the transmissions or close to "instant" repetition where the signal in a legitimate base station is recorded and replayed as soon as possible in a fake base station somewhere else, see illustrations in FIG. 4 and FIG. 5 respectively.

Figure 4:
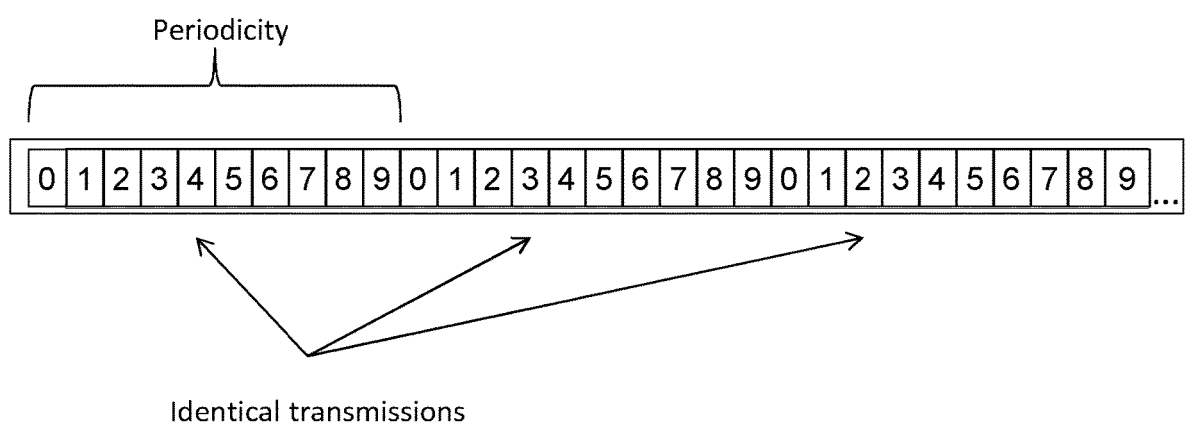
FIG. 4 is a schematic illustration of an example of a replay attack using periodicities.

Regarding FIG. 4, wireless systems may typically have some kind of frame structure with a certain periodicity, as in e.g. LTE and NR which both have a standard System Frame Number (SFN) range of 0 to 1023 covering a total of 10.24 seconds. This implies that, unless any of the broadcast messages are updated due to configuration changes, the entire signal is repeated every 10.24 seconds. In FIG. 4 this is illustrated with a subframe number range from 0-9 which subframes are transmitted in that order repeatedly from the network.

Assuming the standard SFN range is used, for Long Term Evolution (LTE) and New Radio (NR) an attacker could simply record 10.24 seconds of a signal from a legitimate base station and reply the signal in a fake base station. Increasing the duration of the system frame number space makes it more difficult but not impossible for an attacker. In e.g. LTE to cover the IoT use cases an extension of the SFN has been introduced so that the total duration now spans 10485.76 seconds (~2 hours and 55 min).

Figure 5:
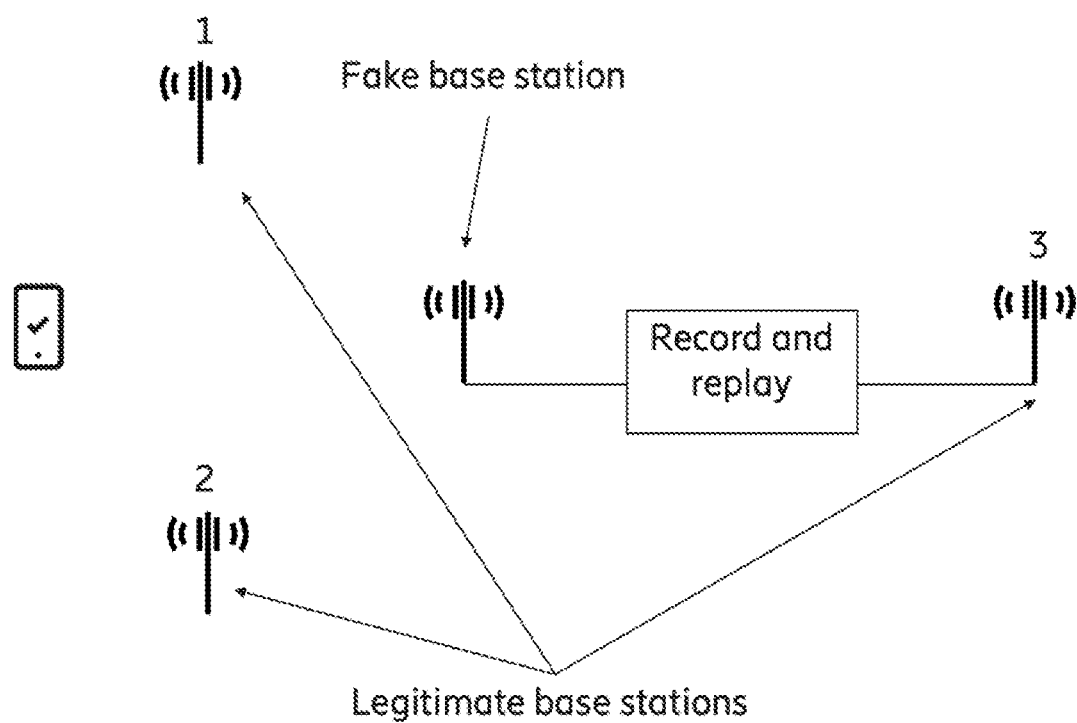
FIG. 5 is a schematic illustration of an example of a replay attack using record and replay.

Replay attacks with more or less "instantaneous" recording and reply are illustrated in FIG. 5. Here the attacker is recording a more distant base station and replaying the signal in a fake base station. Note that some delay in the replay of the record signal is inevitable and may thus be expected since there are both processing and transmission delays before the signal is replayed. For digital repetition where the signal first is recorded, decoded and possibly amplified before it is replayed the delay may at least include the time it takes to read one symbol which in the case for a sub-carrier spacing of 15 KHz corresponds to 66.7 microseconds.

This lead to the observation that from a UE point of view the so called observed time difference (OTD) between the serving cell and any fake base station (posing a legitimate base station) is different from the observed time difference between the serving cell and the corresponding legitimate base station. For analogue repeaters other anomalies that make radio measurements different from proper radio signals may be detected using machine learning.

SA3 has recently started a study to address fake base stations called "Study on 5G security enhancement against false base stations", see SP-180690. The objective is to study the potential threats and privacy issues associated with false base station scenarios as well as to identify the potential solutions for mitigating the risks caused by false base stations.

A problem with the existing broadcast methods may be that there is no defined low-overhead solution for how to avoid that a UE is tricked into accepting a fake broadcast message. One type of broadcast messages to exemplify the behaviour and benefit with embodiments herein are broadcast messages containing system information (SI). Fake SI broadcast messages may be used to make UEs misbehave, which may make services fail. This may potentially be very severe as this may be used as an attack vector not only for the UE accepting the fake broadcast but on the whole system if multiple UEs are tricked into making erroneous transmissions that may be used as a jamming tool or similar. Fake SI broadcast messages may also be used to make UEs attach to a fake base station thus, for example, creating a non-legitimate "man-in-the middle" or just making the UEs miss communication from the true base stations, such as paging messages. By getting UEs to camp on fake base stations, where they cannot be reached, an attacker may also effectively execute a denial-of-service (DoS) attack.

Figure 6A:
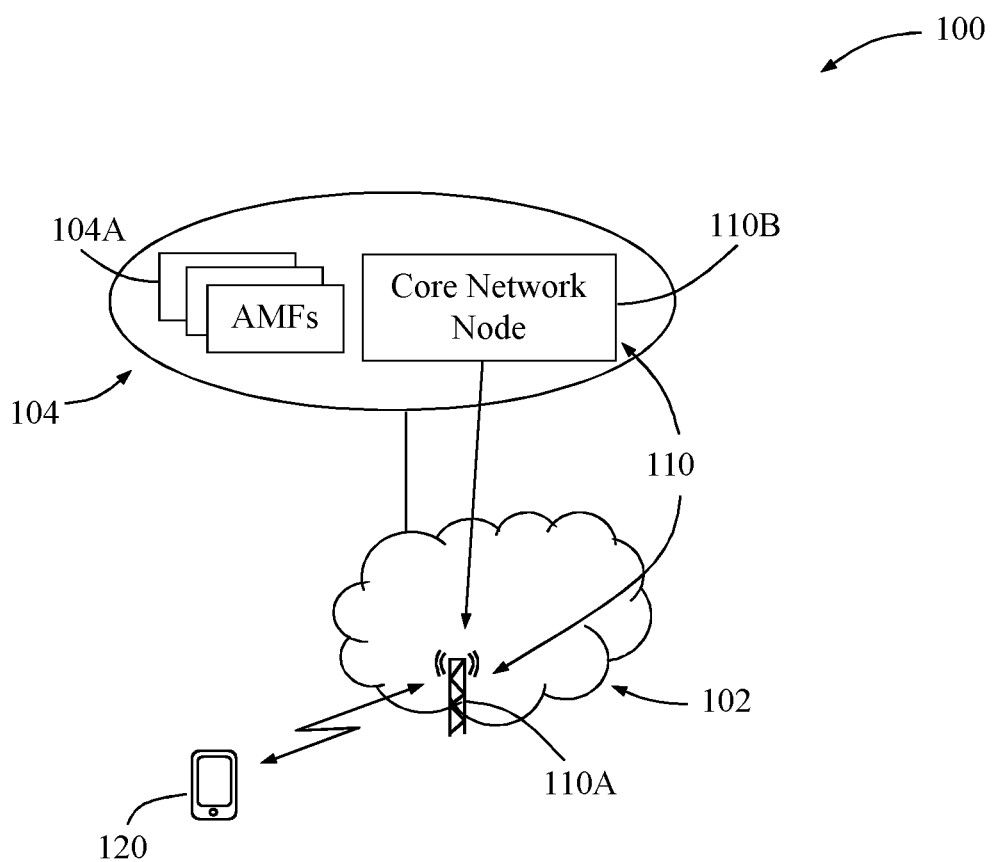
FIG. 6A is a schematic block diagram illustrating embodiments of a wireless communications network.

A communication scenario where the examples and embodiments herein may be employed is illustrated in FIG. 6A showing a wireless communication network 100 where a network node 110 and a wireless device 120 operate. The wireless communication network 100 in this example is shown to comprise a Radio Access Network, RAN, 102 and a core network 104. It should be noted that the network node 110 described herein may be seen as a logic entity that may be implemented in a single physical node, or in two nodes including a radio node in the RAN such as a base station 110A that performs radio communication, and a controlling node such as a core network node 110B in the core network 104 that controls signaling and messages. The core network node may be a security node or the like. If implemented in a single physical node, the network node 110 may be the shown base station 110A or core network node 110B.

The wireless device 120 is served by the network node 110 by communication over a radio link. The network node 110 may without limitation comprise a base station, an eNB or a gNB, depending on the terminology used, and/or a core network node such as a security node. In the shown example the core network 104 comprises a core network node 110A and a set of Access and Mobility Management Functions, AMFs, 104A which basically manage mobility of wireless devices between different RAN nodes or cells.

The wireless communication network 100 may use any of a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Some of the methods and actions described herein may be performed by the network node 110, while other methods and actions herein may be performed by the wireless device 120. As an alternative, a Distributed Node (DN) and functionality, e.g. comprised in a cloud, may be used for performing or partly performing the methods.

In order to prevent wireless devices from accepting fake broadcast messages, signatures on protected broadcast messages are distributed and used in at least some of the embodiments herein. The embodiments herein can be used to improve the security and efficiency in the distribution of keys and such embodiments are also compatible with legacy wireless devices and legacy broadcast messages.

The embodiments herein may be used so that a wireless device at some point can securely connect to a node in the network other than a base station, e.g. a security server in the core network. Using a secure end-to-end encrypted connection the wireless device and the trusted network nodes may then exchange a first set of security keys (which cannot be intercepted by the base station). This implies that the first time the wireless device connects to a network it shall not immediately consider all the broadcasted information to be legitimate. Instead the wireless device needs to perform a bootstrap procedure in order to verify broadcasted information from a base station.

Figure 6B:
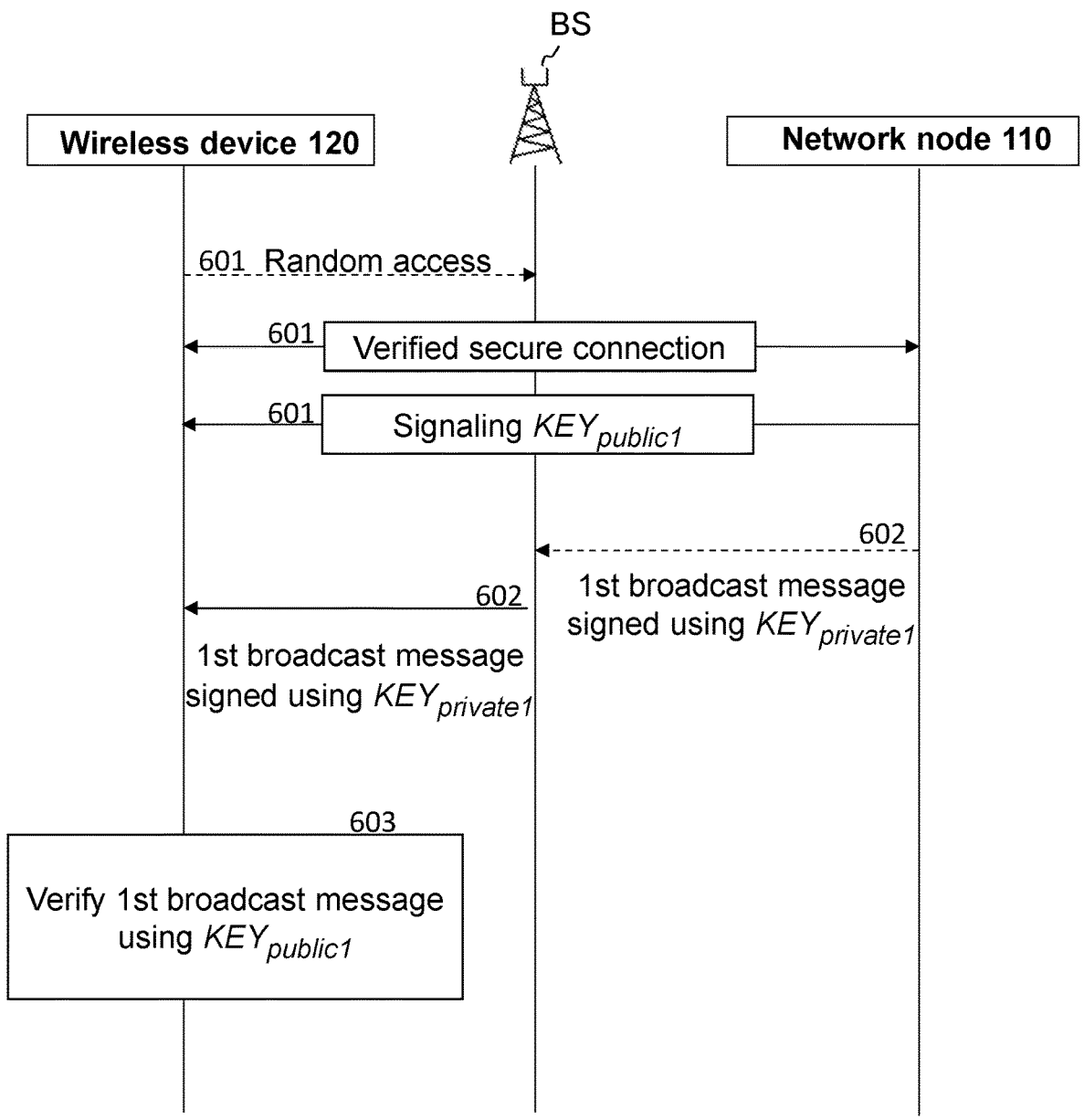
FIG. 6B is a combined signaling scheme and flowchart depicting embodiments herein.

FIG. 6B is a combined flowchart and signaling scheme between the wireless device 120 and the network node 110 of FIG. 6A, according to some of the embodiments herein showing actions that may be performed by the network node 110 to address the above problems associated with fake base stations.

Action 601. Signaling in a protected wireless device 120 specific message, a first public key KEYpublic1, for example in a random access procedure or as part of the AS or NAS security activations procedures.

Action 602. Transmitting, from the network node 110, a first broadcast message protected by a signature, where the signature is generated from at least the protected part of the broadcast message using a first private key KEYprivate1.

Action 603. The first broadcast message is verified, by the wireless device 120, using KEYpublic1.

Figure 6C:
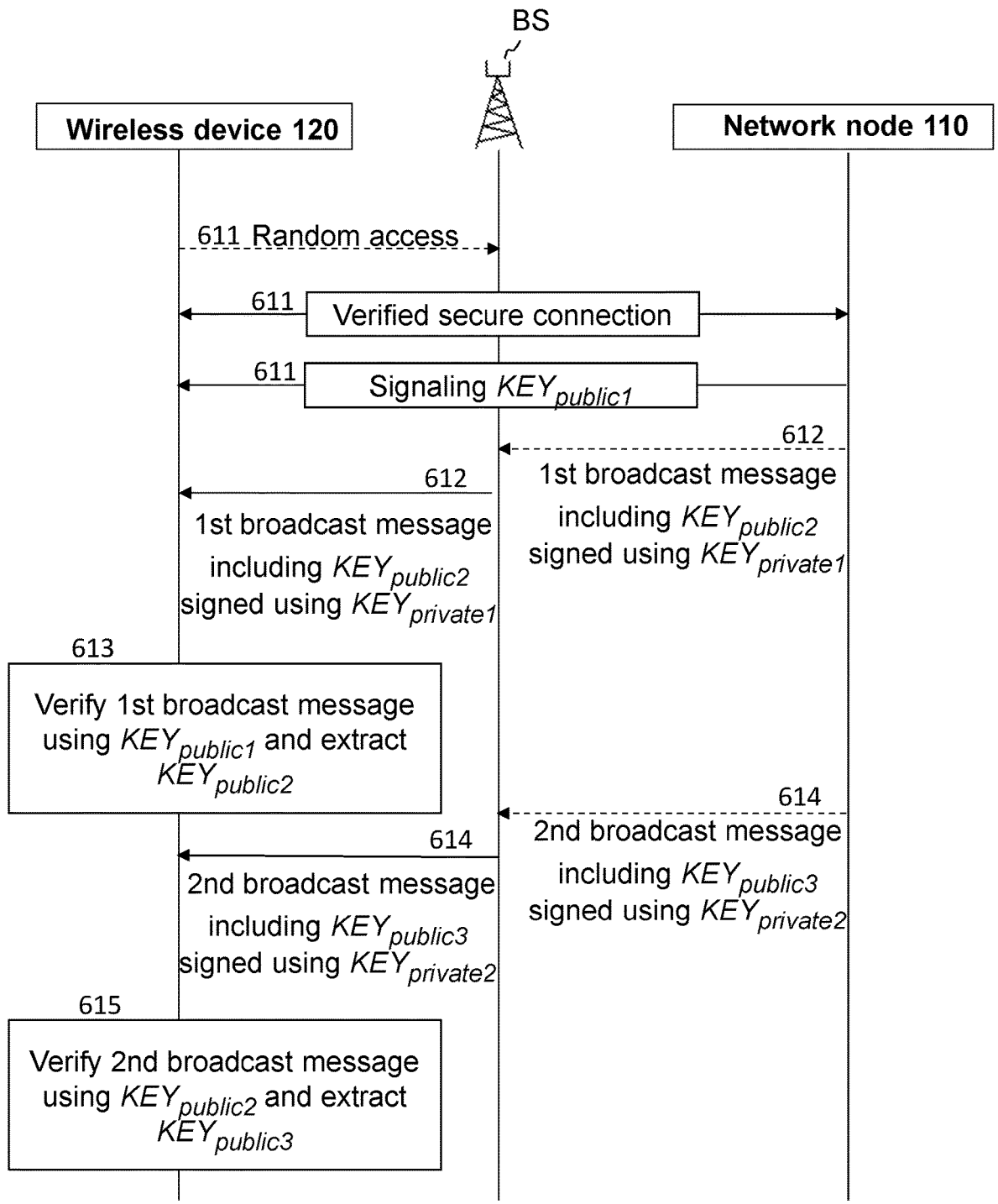
FIG. 6C is a combined signaling scheme and flowchart depicting some embodiments herein.

FIG. 6C is a combined flowchart and signaling scheme according to some further embodiments herein, showing further actions that may be performed by the network node 110 to distribute a new public key.

Action 611. Signaling in a protected wireless device 120 specific message, a first public key KEYpublic1.

Action 612. Transmitting, from the network node 110, a first broadcast message protected by a signature, where the signature is generated from at least the protected part of the broadcast message using a first private key KEYprivate1.

Action 613. The wireless device 120 verifies the first broadcast message, using KEYpublic1 and extracts KEYpublic2.

Action 614. Transmitting, from the network node 110, a second broadcast message at least partly signed using a second private KEYprivate2.

Action 615. The second broadcast message is verified, by the wireless device 120, using KEYpublic2 and extracts KEYpublic3.

In some embodiments the protected part of the broadcast messages may comprise a counter, such as the above-mentioned SFN. In some embodiments this counter may be explicitly encoded in some implicitly by only encoding some of the SFN and letting the UE "dead-count" the rest of the SFN. In some embodiments implicitly may mean that a SFN is transmitted in one or multiple other broadcast messages and is only appended to the protected part of the broadcast message when calculating the signature. In some embodiments the standard SFN range (time) may be extended to allow for less frequent updates of the keys and in some embodiments the extension may be aligned with the duration of some NAS timers such as the periodic Tracking/Routing Area update timer. In some embodiments the SFN extension bits may be sent in this way, e.g. as part of the same broadcast message, so that the wireless device may decode all information needed quickly and then go to sleep again to save power.

In some embodiments the protected part of the broadcast messages may comprise a pseudo random number. In some embodiments a pseudo random number R may be known and, for example, appended to the broadcast message when calculating a signature Sofa broadcast message B, e.g. $S=E(H([B,R]))$. In some embodiments, the pseudo random number may be transmitted in one or multiple other broadcast messages and only, for example, appended to the protected part of the broadcast message when calculating the signature. In some embodiments of the invention the keys for signing messages may comprise a pseudo random number seed used to calculate a pseudo random number for each broadcast message according to a counter, such as SFN.

The embodiments described herein may be used in a procedure for enabling verification of a broadcast message transmitted from a network node to a wireless device. Any of the following advantages may be achieved by employing the embodiments herein:

An advantage of the embodiments herein is that broadcast messages may be verified by the wireless device thus preventing fake broadcast messages. A further advantage is that the keys used for signing the broadcast messages may be distributed very efficiently as the wireless device in possession of a first public key can use this key to verify a second public key contained in a further broadcast message, and so forth. This makes the broadcasting secure because the signatures are generated using (one or more) private keys never sent over the air thus making these unknown to anyone who might want to send fake broadcast messages.

Another advantage is that by adding pseudo random numbers that are changing for each broadcast message, any replay attacks may be made impossible or at least much harder to do, which will be described more in detail below.

A significant feature with the embodiments herein is for the network node to send a first public key to a wireless device using a secure connection and then be able to send further public keys in broadcast messages without requiring a secure connection, thus enabling efficient key distribution using broadcast and thus enabling broadcast message verification.

Figure 7:
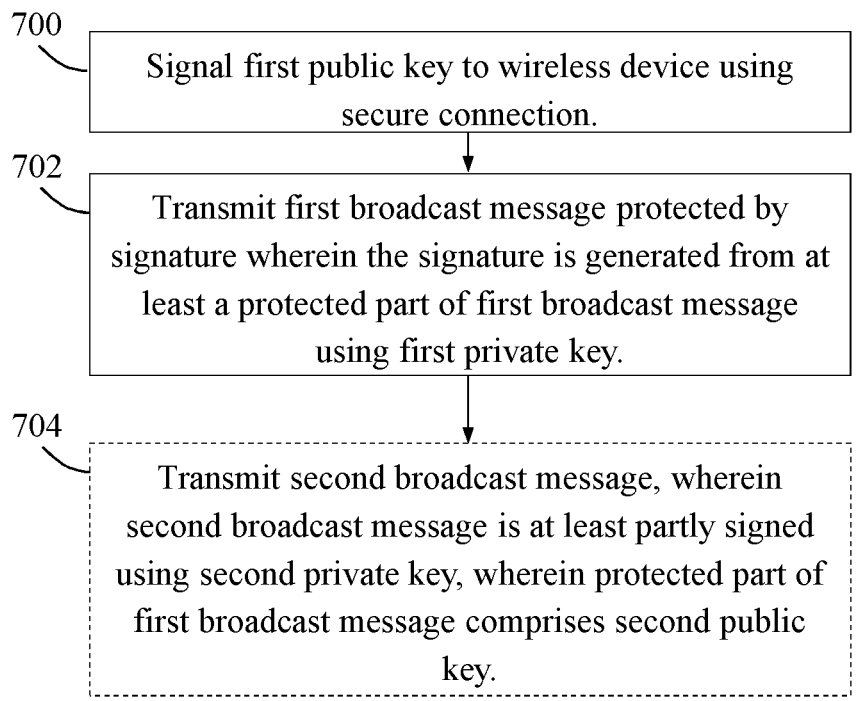
FIG. 7 is a flowchart depicting embodiments of a method performed by a network node in the wireless network.

An example method of how the embodiments herein may be employed in terms of actions performed by a network node such as the network node 110, is illustrated by the flow chart in FIG. 7. FIG. 7 thus illustrates an example method in the network node 110 for enabling verification of a broadcast message transmitted from the network node 110 to the wireless device 120 in the wireless communication network 100. Some optional example embodiments that could be used in this procedure will also be described.

A first action 700 illustrates that the network node 110 signals a first public key, to the wireless device 120 using a secure connection.

In another action 702, the network node 110 further transmits a first broadcast message protected by a signature, wherein the signature is generated from at least a protected part of the first broadcast message using a first private key, the first private key being associated with the first public key.

In another optional action 704, the protected part of the first broadcast message comprises a second public key, and in that case the network node 110 may further transmit a second broadcast message, wherein the second broadcast message is at least partly signed using a second private key, the second private key being associated with the second public key.

Figure 8:
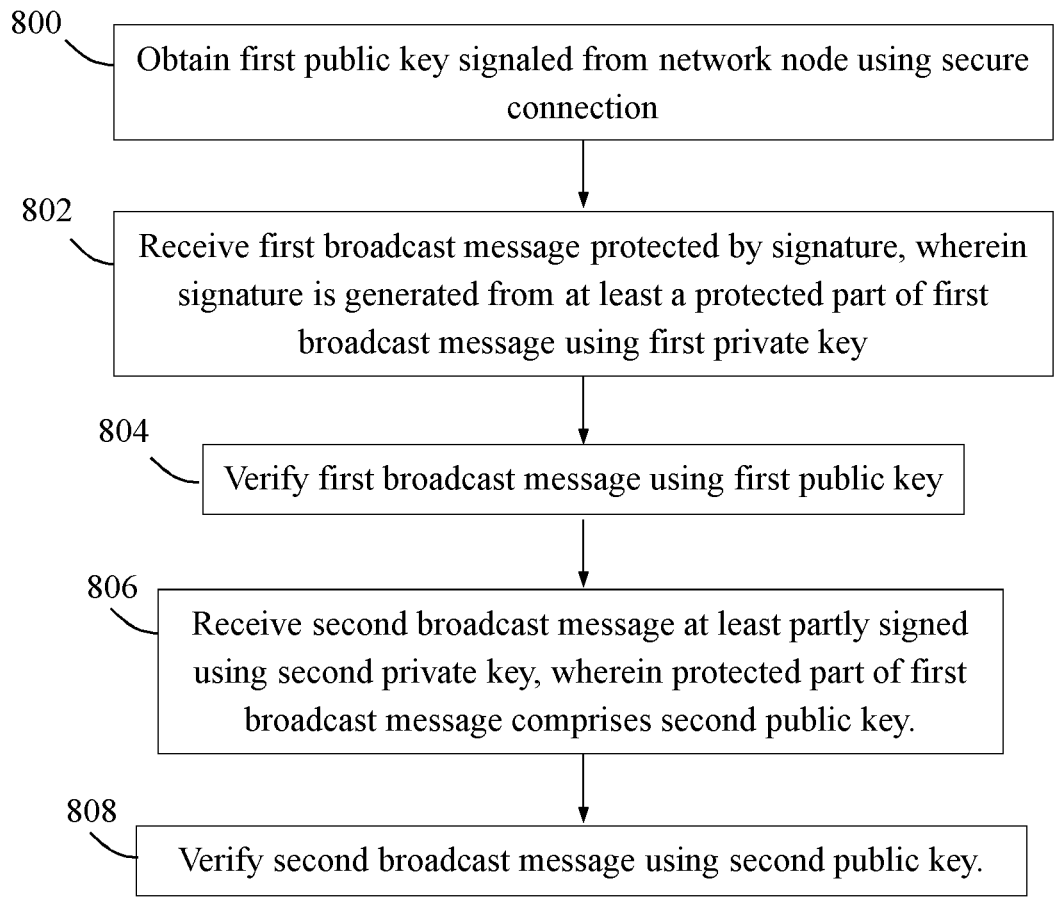
FIG. 8 is a flowchart depicting embodiments of a method performed by a wireless device in the wireless network.

Another example method of how the embodiments herein may be employed in terms of actions performed by a wireless device such as the wireless device 120, is further illustrated by the flow chart in FIG. 8. FIG. 8 thus illustrates an example method in the wireless device 120 for enabling verification of a broadcast message transmitted from the network node 110 to the wireless device 120 in the wireless communication network 100. Some optional example embodiments that could be used in this procedure will also be described.

A first action 800 illustrates that the wireless device 120 obtains a first public key, signaled from the network node 110 using a secure connection.

A further action 802 illustrates that the wireless device 120 receives a first broadcast message protected by a signature, wherein the signature is generated from at least a protected part of the first broadcast message using a first private key, the first private key being associated with the first public key.

In another action 804, the wireless device 120 verifies the first broadcast message using the first public key. This is thus possible since the first private key is associated with the first public key.

In another optional action 806, the protected part of the first broadcast message comprises a second public key, and in that case the wireless device 120 may receive a second broadcast message, wherein the second broadcast message is at least partly signed using a second private key, the second private key being associated with the second public key.

In a final action 808, the wireless device 120 may verify the second broadcast message using the second public key. This is thus possible since the second private key is associated with the second public key which the wireless device 120 has received in action 806.

Embodiments herein such as mentioned above will now be further described and exemplified. The text below is applicable to and may be combined with any suitable embodiment described above.

Figure 9:
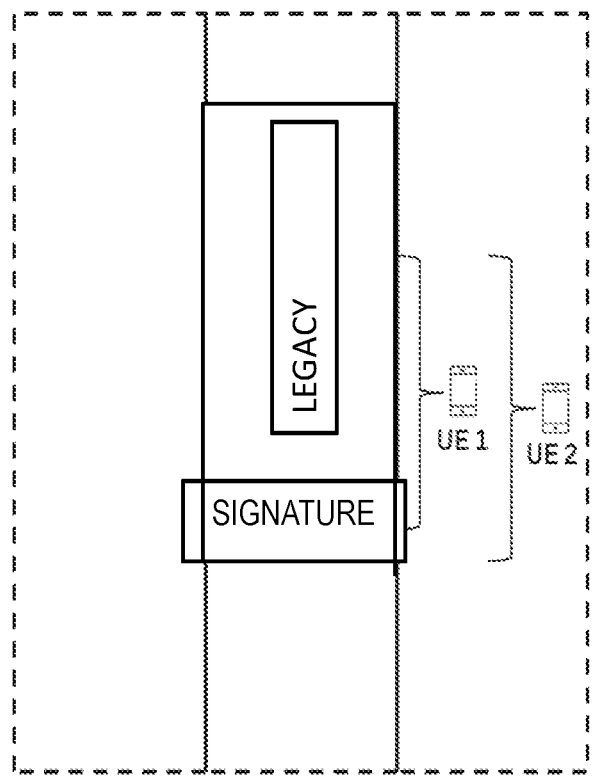
FIG. 9 is a schematic illustration of an example of how a legacy broadcast message may be protected.

An example method of how the embodiments herein may be employed to efficiently enable verification of broadcast messages is illustrated in FIG. 9. Here the embodiments herein are shown in its basic form as described in the previous section.

It should be noted that any legacy broadcast message may be protected by adding to the message an additional part that a legacy wireless device, such as a UE, will ignore (UE 1) and only be read by newer UEs (UE 2) supporting validation functions for broadcast messages. Such information may e.g. be provided as a "release extension to a system information block (SIB) or Master Information Block (MIB)" i.e. an information element ignored by legacy UEs not supporting a newer 3GPP release. Alternatively the signature may be separately provided in a new SIB, or in a separately scheduled transmission, or even in a new physical channel.

In some embodiments multiple public keys may be distributed by the network, for example, one per UE category. When receiving the broadcast message the UE will check the signature and see if the broadcast message is intended for that UE. In some embodiments multiple networks may be using the same carrier and each, for example, operator may have its own signature and thus users may detect if the message was from the own operator.

The embodiments herein that may be used to stop or at least make it very hard to make replay attacks may employ a time-varying component as follows. This time-varying component may be; a random number plus SFN, an agreed pseudo random generation method, a seed and a counter e.g. SFN. The benefit with using a seed and the SFN in combination is that the seed then only needs to be updated whenever SFN wraps-around and thereby avoids unnecessary changes and UE readings of system information messages.

These time-varying components may be part of the broadcast messages or part of the keys or provided via encrypted NAS messages. For example, a key may be one encryption key (e.g. RSA) and a pseudo random seed for an agreed pseudo random number generation method using the SFN (including any extension). But multiple other options are possible, for example, including a random number in each broadcast message, or combining random number that is broadcasted independently of the key distribution and including the SFN and a random number etc.

When a practical counter is used the key distribution must change at least parts of the key more regularly than the time that the counter "wraps-around". The distribution may thus be synchronized and adopted to different UE categorizes and DTX/DRX settings. As an example, in some embodiments it is therefore proposed to extend the SFN range (time) so that the total time spanned by the extended SFN range is slightly longer than the configured/specified duration of the use of each key pair.

One limiting factor for if and how replay attacks can be used is the time it takes to listen and then replay a broadcast message and the clock accuracy of the UE. That is, if the time error when a broadcast message is transmitted is large enough so that the UE may detect that the timing does not abide to the counter agreed between the UE and the network. As an example assume e.g. that system information provides the UE with information of the expected or lowest possible observed time difference (OTD) between the serving cell and the closest neighbours (e.g. the cells in the neighbour cell list) and that the UE will, when measuring an OTD outside the expected range, take further steps to verify the authenticity of the base station by triggering a secure message exchange with the cell before camping on it. The recording and replying of a distant base station would typically introduce some processing and transmission time delays which in turn would show up as a longer than expected OTD.

As mentioned above, a limiting factor for an attacker thus includes how quickly a message can be replayed. In some embodiments the key and/or random number is frequency dependent. Thus, an attacker needs to listen and replay the message in the same frequency it was originally transmitted. If the attacker wants to start the replay while the broadcast is still transmitting using different keys for different frequencies it makes the task harder for the attacker as the attacker needs to separate the receiver from the transmitter and thus create additional delay. The need for separation is so that the transmitter does not interfere with the receiver.

From the system side clearly, tight synchronization is needed between base stations in order to tighten the expected arrival time of a broadcast message at the UE. Moreover, synchronization of the SFN level is also needed in order to prevent attackers from simply shifting the transmission of the sync signals in time such that similar OTD values would be measured in the UE. For the UE side, basically the better clock the UE has the better detection probability of a late broadcast, hence UEs requirements on clock accuracy may be used when categorizing UEs as "secure". Typically, the clock error may be kept very low as long as the UE is not sleeping. Many critical types of tasks, such as automatic factories, vehicle systems etc. has no sleep duration when in operation and may thus be made very resilient to fake base station attacks using the embodiments herein.

To make a replay attack even more difficult the signature may also be dependent on geolocation data. In that way UEs that can determine their position with sufficient accuracy may trust a broadcasted message compliant with the geolocation. UEs that cannot determine a sufficiently accurate geolocation may be more suspicious towards the broadcasted information and e.g. only decide to trust it after a handshake with a trusted node in e.g. the core network.

In some embodiments additional steps may be taken in order to prevent UEs from camping on fake base stations or to facilitate the network detecting false base stations. A method is introduced wherein in the network:

Base stations, such as the network node 110, sign the broadcast information as described, i.e. attaches a signature to the broadcast information, using a one of the keys in an asymmetric cryptographic algorithm (private or public)

Base stations, such as the network node 110, are synchronized to an OFDM-symbol accuracy; i.e. also with respect to frame boundaries and System Frame Number (SFN).

Optionally the base stations, such as the network node 110 broadcast an indication of the expected observed time difference (OTD) of the cells in the neighbour cells list possibly also indicating expected relative signal strength per neighbour cell. In some embodiments this may be a network synchronization message indicating the synchronization state of the network, possibly a single bit. In some embodiments only a list of identities may be transmitted and any base station not in this list of identities is expected to have 0 power.

Thereby, a UE, such as the wireless device 120:

Reads system information in the serving cell to verify the signature of the system information using the obtained key in an asymmetric key pair (private or public) as described above.

Measures and calculates OTD to the neighbour cells and either compares the values with the one provided in system information in the serving cell or by signaling the measurements to the network. Optionally also measuring the received signal strength of the neighbour cells and comparing them with what is indicated in the serving cell.

Before deciding to camp on another cell with an "unusual" OTD value or signal strength, i.e. different from what is indicated in system information in the serving cell, initiating a secure message exchange to verify the authenticity of the candidate cell.

Note, that optionally the network may only indicate in system information that the network is synchronized (or to within which accuracy the network is synchronized) and that the UE, such as the wireless device 120, independently measures OTD values to neighbour cells and before deciding to camp on cell with an "unusual" OTD value to the serving cell initiates a secure message exchange to verify the authenticity of the candidate cell.

It should also be noted that an "unusual" OTD value may be due to a legitimate cell temporarily falling out of sync or due to deployment of a new base station. In other words, the UE should avoid from automatically identifying such a cell as fake cell or fake base station but instead initiate a secure message exchange to verify the authenticity of the candidate cell/base station.

Instead of providing the key updates and optionally also the seed updates through system broadcast the updates are provided through NAS signaling such as periodic Tracking/Routing Area update. Therefore, in some embodiments a set of keys and optionally a set of seeds may be provided at Tracking/Routing Area update, KEYpublic1, KEYpublic2, KEYpublic3, . . . KEYpublicn, KEYseed1, KEYseed2, KEYseed3, . . . KEYseedn. The sets may be used by the UE until next Tracking/Routing Area update. When to use each key/seed may be provided along with the sets of keys/seeds or may be hard coded. Assume e.g. that the Periodic Tracking Area update timer is set to 4 hours. The network would then provide the UE with e.g. two different keys to be used until next Tracking Area Update (TAU). The UE may either blindly use either key/seed or use instructions on when to use the key/seed, e.g. use KEYpublic1 in current SFN (including extension) and KEYpublic2 after the SFN (including extension) wraps around.

Figure 10:
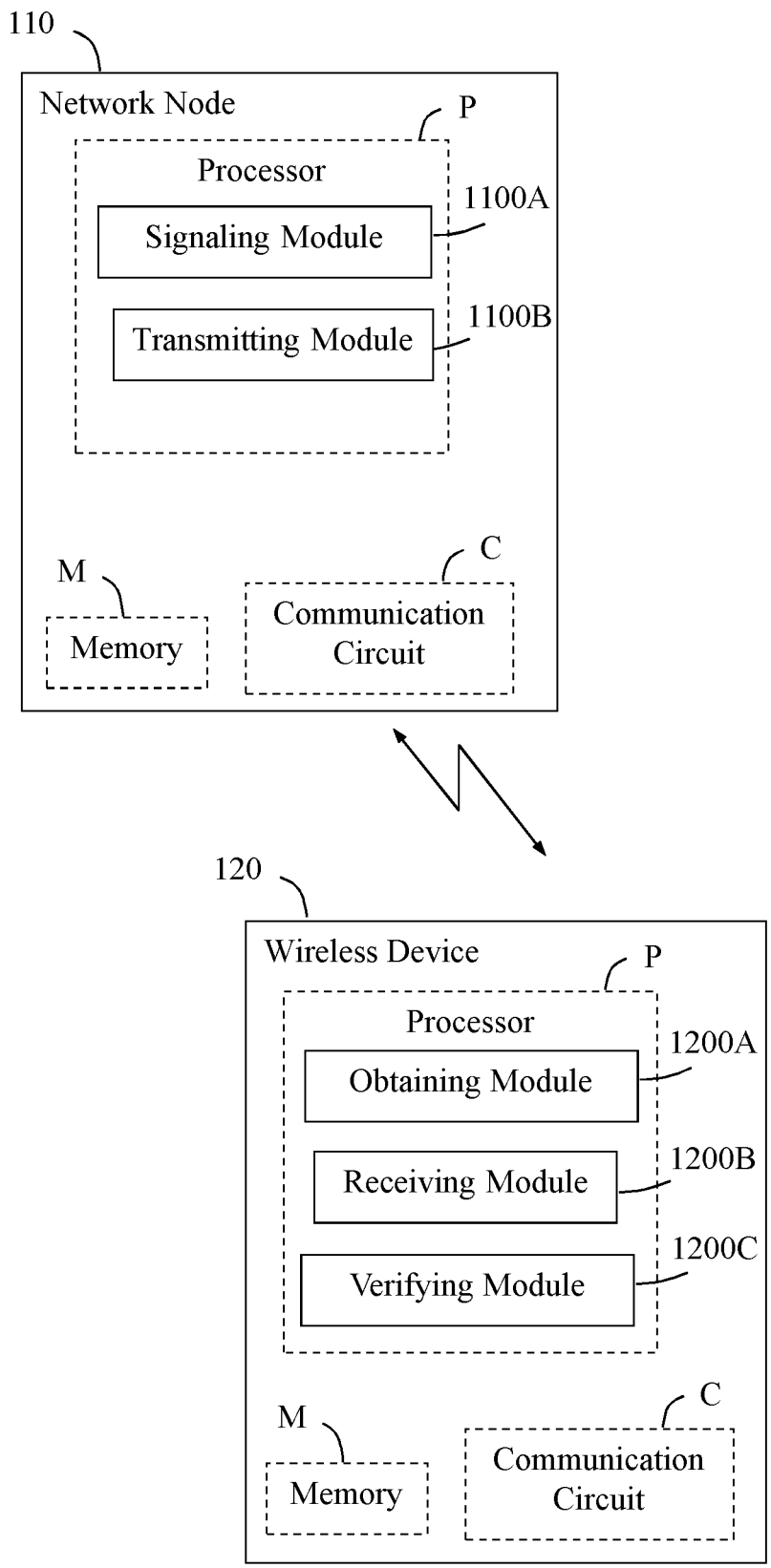
FIG. 10 is a schematic block diagram illustrating a network node and a wireless device according to some embodiments herein.

The block diagram in FIG. 10 illustrates a detailed but non-limiting example of how a network node 110 and a wireless device 120, respectively, may be structured to bring about the above-described embodiments herein. In this figure, the network node 110 and the wireless device 120 may be configured to operate according to any of the examples and embodiments of employing the solution as described herein, where appropriate. Each of the network node 110 and the wireless device 120 is shown to comprise a processor "P", a memory "M" and a communication circuit "C" with suitable equipment for transmitting and receiving signals and messages in the manner described herein.

The communication circuit C in each of the network node 110 and the wireless device 120 thus comprises equipment configured for communication with each other using a suitable protocol for the communication depending on the implementation. The solution is however not limited to any specific types of signals or protocols.

The network node 110 is, e.g. by means of units, modules or the like, configured or arranged to perform at least some of the actions of the flow chart in FIG. 7 as follows. Further, the wireless device 120 is, e.g. by means of units, modules or the like, configured or arranged to perform at least some of the actions of the flow chart in FIG. 8 as follows.

As indicated above, the network node 110 may be implemented in a single physical node, or in two nodes including a radio node (e.g. a base station) that performs radio communication and a controlling node (e.g. a core network node) that controls signaling and messages.

The network node 110 is arranged to enable verification of a broadcast message transmitted from the network node 110 to the wireless device 120. The network node 110 is configured to signal a first public key, to the wireless device 120 using a secure connection. This operation may be performed by a signaling module 1100A in the network node 110, as illustrated in action 700.

The network node 110 is also configured to transmit a first broadcast message which is protected by a signature, wherein the signature is adapted to be generated from at least a protected part of the first broadcast message using a first private key, the first private key being associated with the first public key. This operation may be performed by a transmitting module 1100B, as illustrated in action 702.

The network node 110 may also be configured to transmit a second broadcast message, wherein the second broadcast message is at least partly signed using a second private key, the second private key being associated with the second public key. This operation may be performed by the transmitting module 1100B, as illustrated in action 704.

The wireless device 120 is arranged to verify a broadcast message transmitted from the network node 110 to the wireless device 120. The wireless device 120 is configured to obtain a first public key, signaled from the network node 110 using a secure connection. This operation may be performed by an obtaining module 1200A in the wireless device 110 as illustrated in action 800.

The wireless device 120 is configured to receive a first broadcast message which is protected by a signature, wherein the signature is adapted to be generated from at least a protected part of the first broadcast message using a first private key, the first private key being associated with the first public key. This operation may be performed by a receiving module 1200B in the wireless device 120 as illustrated in action 802.

The wireless device 120 is also configured to verify the first broadcast message using the first public key. This operation may be performed by a verifying module 1200C as illustrated in action 804.

The wireless device 120 may further be configured to receive a second broadcast message, wherein the second broadcast message is at least partly signed using a second private key, the second private key being associated with the second public key. This operation may be performed by the receiving module 1200B in the wireless device 120, as illustrated in action 806.

The wireless device 120 may further be configured to verify the second broadcast message using the second public key. This operation may be performed by the verifying module 1200C in the wireless device 120, as illustrated in action 808.

It should be noted that FIG. 10 illustrates various functional modules in the network node 110 and the wireless device 120, respectively, and the skilled person is able to implement these functional modules in practice using suitable software and hardware equipment. Thus, the solution is generally not limited to the shown structures of the network node 110 and the wireless device 120, and the functional modules therein may be configured to operate according to any of the features, examples and embodiments described in this disclosure, where appropriate.

The functional modules 1100A-B and 1200A-C described above may be implemented in the network node 110 and the wireless device 120, respectively, by means of program modules of a respective computer program comprising code means which, when run by the processor P causes the network node 110 and the wireless device 120 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 110 and the wireless device 120 in the form of a memory having a computer readable medium and being connected to the processor P. The computer program product or memory M in each of the network node 110 and the wireless device 120 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 110 and wireless device 120.

The solution described herein may be implemented in each of the network node 110 and the wireless device 120 by a computer program comprising instructions which, when executed on at least one processor, cause the at least one processor to carry out the actions according to any of the above embodiments and examples, where appropriate. The solution may also be implemented at each of the network node 110 and the wireless device 120 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless device", "broadcast message", "signature", "public key", "private key" "secure connection" have been used throughout this disclosure, although any other corresponding entities, functions, and/or parameters could also be used having the features and characteristics described here. The solution may be implemented according to the appended embodiments.

Some example Embodiments numbered 1-16 are described below. The following embodiments refer among other things to FIG. 6B, FIG. 6C, FIG. 7, FIG. 8 and FIG. 10.

Embodiment 1. A method performed by a network node (110) for enabling verification of a broadcast message transmitted from the network node (110) to a wireless device (120), which network node (110) and wireless device (120) operate in a wireless communication network (100), the method comprising:
  signaling (300) a first public key, to the wireless device (120) using a secure connection, and
  transmitting (302) a first broadcast message protected by a signature, wherein the signature is generated from at least a protected part of the first broadcast message using a first private key, the first private key being associated with the first public key.

Embodiment 2. The method according to embodiment 1, wherein the protected part of the first broadcast message comprises a second public key, the method further comprising:
  transmitting (304) a second broadcast message, wherein the second broadcast message is at least partly signed using a second private key, the second private key being associated with the second public key.

Embodiment 3. The method according to embodiment 2, wherein a protected part of the second broadcast message comprises a third public key.

Embodiment 4. A method performed by a wireless device (120) for verifying a broadcast message transmitted from a network node (110) to the wireless device (120), which network node (110) and wireless device (120) operate in a wireless communication network (100), the method comprising:
  obtaining (400) a first public key, signaled from the network node (110) using a secure connection,
  receiving (402) from the network node (110) a first broadcast message protected by a signature, wherein the signature is generated from at least a protected part of the first broadcast message using a first private key, the first private key being associated with the first public key, and
  verifying (404) the first broadcast message using the first public key.

Embodiment 5. The method according to embodiment 4, wherein the protected part of the first broadcast message comprises a second public key, the method further comprising:
  receiving (406) a second broadcast message, wherein the second broadcast message is at least partly signed using a second private key, the second private key being associated with the second public key, and
  verifying (408) the second broadcast message using the second public key.

Embodiment 6. The method according to embodiment 5, wherein a protected part of the second broadcast message comprises a third public key.

Embodiment 7. The method according to any of embodiments 4-6, wherein the method is performed when detecting that an observed time difference, OTD, of receiving the first broadcast message from the network node (110) exceeds a predetermined range.

Embodiment 8. A network node (110) for enabling verification of a broadcast message transmitted from the network node (110) to a wireless device (120), wherein the network node (110) is configured to:
  signal a first public key, to the wireless device (120) using a secure connection, and
  transmit a first broadcast message protected by a signature, wherein the signature is adapted to be generated from at least a protected part of the first broadcast message using a first private key, the first private key being associated with the first public key.

Embodiment 9. The network node (110) according to embodiment 8, wherein the protected part of the first broadcast message comprises a second public key, and wherein the network node (110) is further configured to:
  transmit a second broadcast message, wherein the second broadcast message is at least partly signed using a second private key, the second private key being associated with the second public key.

Embodiment 10. The network node (110) according to embodiment 9, wherein a protected part of the second broadcast message is adapted to comprise a third public key.

Embodiment 11. A wireless device (120) for verifying a broadcast message transmitted from a network node (110) to the wireless device (120), wherein the wireless device (120) is configured to:
obtain a first public key, signaled from the network node (110) using a secure connection,
receive from the network node (110) a first broadcast message protected by a signature, wherein the signature is adapted to be generated from at least a protected part of the first broadcast message using a first private key, the first private key being associated with the first public key, and
verify the first broadcast message using the first public key.

Embodiment 12. The wireless device (120) according to embodiment 11, wherein the protected part of the first broadcast message comprises a second public key, and wherein the wireless device (120) is further configured to:
receive a second broadcast message, wherein the second broadcast message is at least partly signed using a second private key, the second private key being associated with the second public key, and
verify the second broadcast message using the second public key.

Embodiment 13. The wireless device (120) according to embodiment 12, wherein a protected part of the second broadcast message is adapted to comprise a third public key.

Embodiment 14. The wireless device (120) according to any of embodiments 11-13, wherein the wireless device (120) is further configured to obtain the first public key, receive the first broadcast message and verify the second broadcast message when detecting that an observed time difference, OTD, of receiving the first broadcast message from the network node (110) exceeds a predetermined range.

Embodiment 15. A computer program comprising instructions, which when executed by a processor, causes the processor to perform actions according to any of the embodiments 1-3 or according to any of the embodiments 4-7.

Embodiment 16. A carrier comprising the computer program of embodiment 15, wherein the carrier is one of an electronic signal, an optical signal, an electromagnetic signal, a magnetic signal, an electric signal, a radio signal, a microwave signal, or a computer-readable storage medium.

Some further extensions and variations will now be described with reference to FIGS. 11-16.

Figure 11:
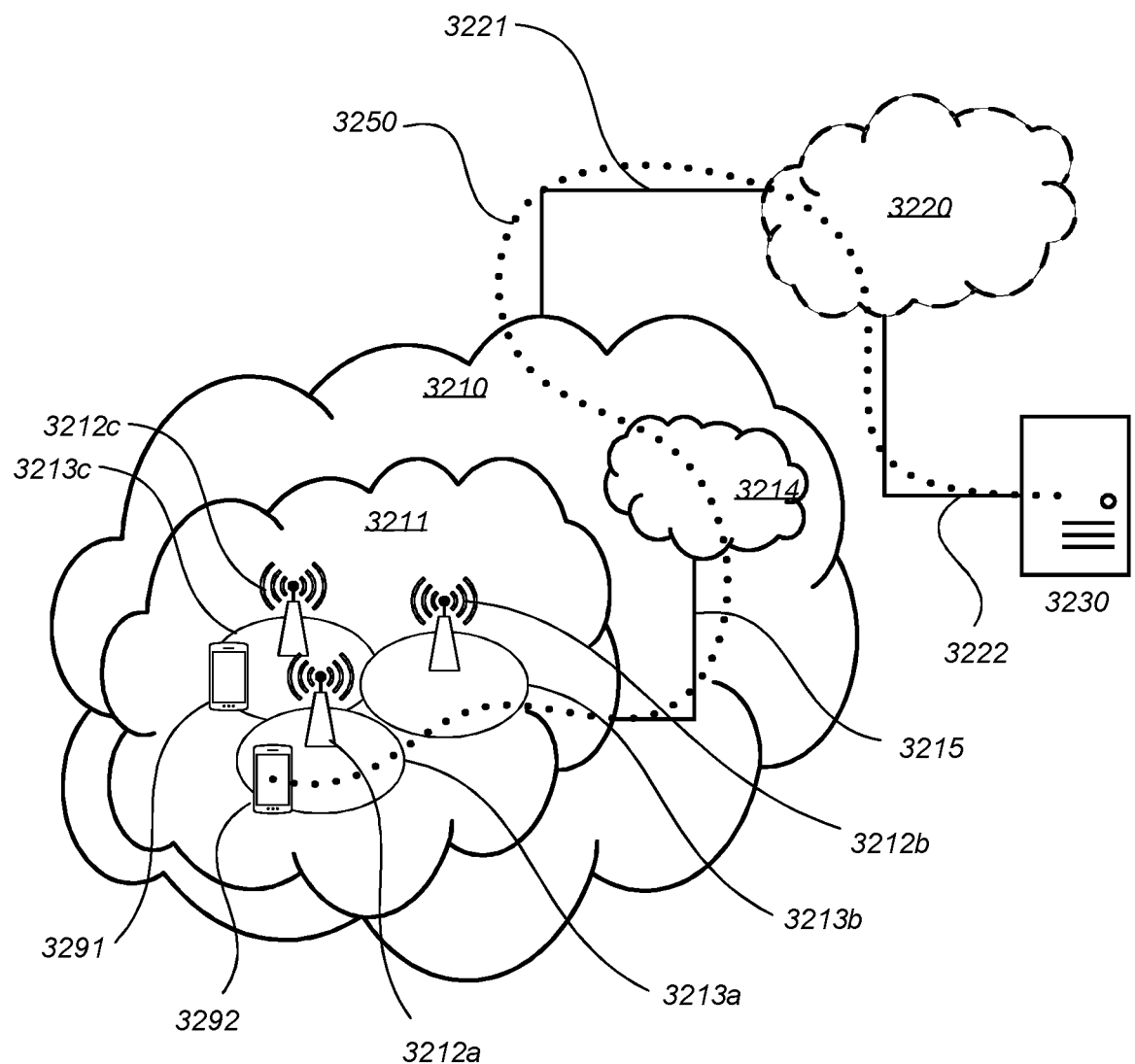
FIG. 11 is a schematic block diagram illustrating a host computer communicating via a base station with a user equipment over a partially wireless connection in accordance with some embodiments.

With reference to FIG. 11, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3260. The host computer 3230 and the connected UEs 3291, 3292 are configured to communicate data and/or signaling via the OTT connection 3260, using the access network 3211, the core network 3214, any intermediate network 3220 and possible further infrastructure (not shown) as intermediaries. The OTT connection 3260 may be transparent in the sense that the participating communication devices through which the OTT connection 3260 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3360 terminating at the UE 3330 and the host computer 3310. In providing the service to the remote user, the host application 3312 may provide user data which is transmitted using the OTT connection 3360.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3360 terminating at the UE 3330 and the host computer 3310. In providing the service to the user, the client application 3332 may receive request data from the host application 3312 and provide user data in response to the request data. The OTT connection 3360 may transfer both the request data and the user data. The client application 3332 may interact with the user to generate the user data that it provides.

Figure 12:
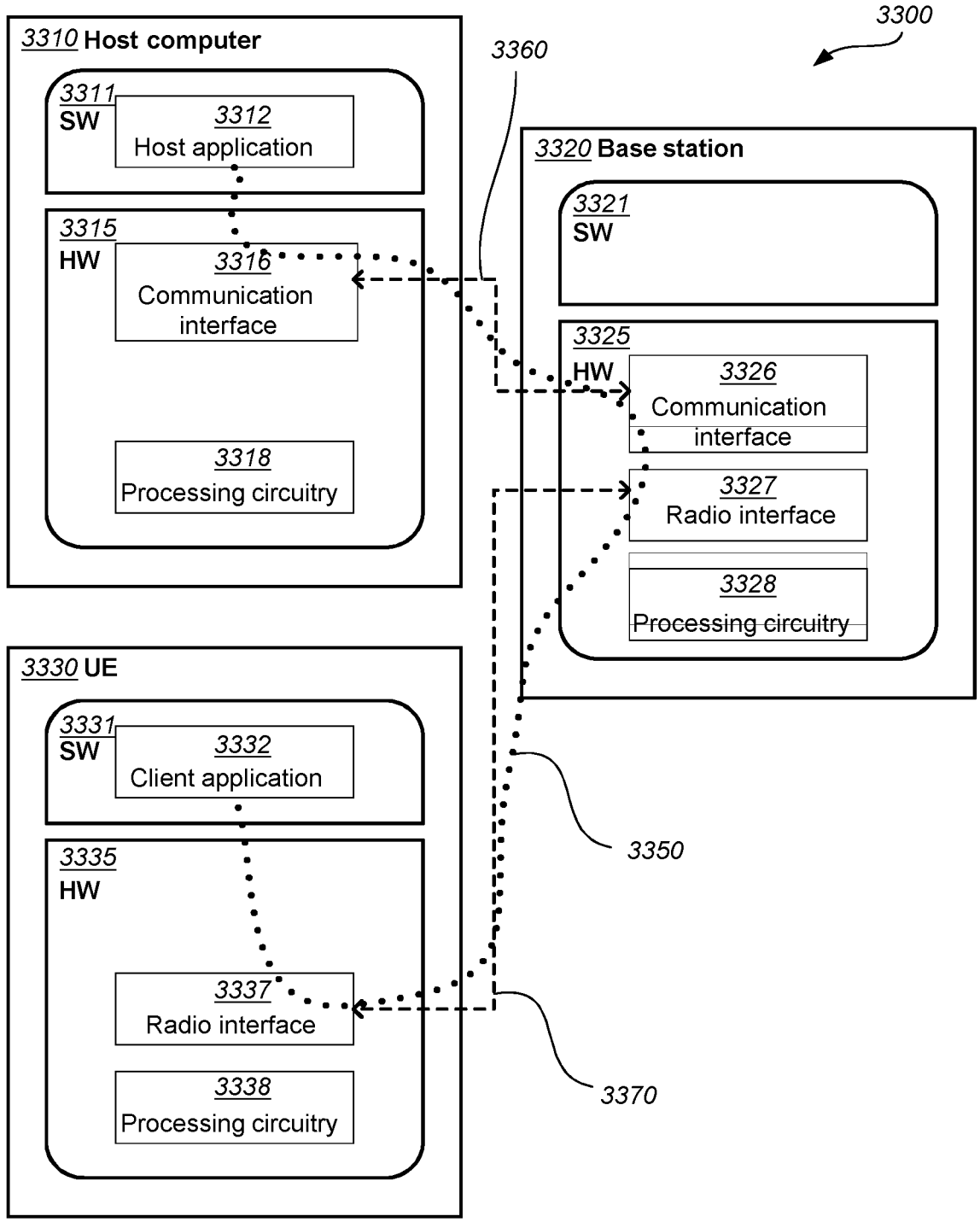
FIG. 12 is a schematic overview of a host computer communicating via a base station with a user equipment over a partially wireless connection in accordance with some embodiments.

It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3360 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3360 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3360, in which the wireless connection 3370 forms the last segment. More precisely, the teachings of these embodiments may improve the efficiency in communication and thereby provide benefits such as better utilization of resources in the network.

A measurement procedure may be provided for the purpose of monitoring data rate, latency and other factors on which the one or more embodiments improve. There may further be an optional network functionality for reconfiguring the OTT connection 3360 between the host computer 3310 and UE 3330, in response to variations in the measurement results. The measurement procedure and/or the network functionality for reconfiguring the OTT connection 3360 may be implemented in the software 3311 of the host computer 3310 or in the software 3331 of the UE 3330, or both. In some embodiments, sensors (not shown) may be deployed in or in association with communication devices through which the OTT connection 3360 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3360 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3360 while it monitors propagation times, errors etc.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as an AP STA, and a UE such as a Non-AP STA which may be those described with reference to FIGS. 11 and 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a wireless device for verifying a broadcast message transmitted from a network node to the wireless device, which network node and wireless device operate in a wireless communication network, the method comprising:
  receiving, from the network node, an indication of an expected observed time difference (OTD) between receiving the first broadcast message by the wireless device and receiving the first broadcast message by neighbor cells in a neighbor cells list;
  measuring an OTD between receiving the first broadcast message by the wireless device and receiving the first broadcast message by the neighbor cells and comparing the measured OTD with the expected OTD received from the network node; and
  when a difference between the observed OTD and the expected OTD exceeds a predetermined range, before making a decision to camp on the network node, verifying an authenticity of the network node by triggering a secure message exchange with the network node comprising:
    obtaining a first public key, signaled from the network node using a secure connection;
    receiving from the network node a first broadcast message protected by a signature, the signature being generated from at least a protected part of the first broadcast message using a first private key, the first private key being associated with the first public key, the protected part of the first broadcast message comprising a pseudo random number; and
    verifying the first broadcast message using the first public key.

2. The method according to claim 1, wherein the method is performed when detecting that an OTD of receiving the first broadcast message from the network node exceeds a predetermined range.

3. A wireless device for verifying a broadcast message transmitted from a network node to the wireless device, which network node and wireless device are operable in a wireless communication network, the wireless device being configured to:
  receive, from the network node, an indication of an expected observed time difference (OTD) between receiving the first broadcast message by the wireless device and receiving the first broadcast message by neighbor cells in a neighbor cells list;
  measure an OTD between receiving the first broadcast message by the wireless device and receiving the first broadcast message by the neighbor cells and compare the measured OTD with the expected OTD received from the network node; and
  when a difference between the observed OTD and the expected OTD exceeds a predetermined range, before making a decision to camp on the network node, verify an authenticity of the network node by triggering a secure message exchange with the network node:
    obtaining a first public key, signaled from the network node using a secure connection;
    receiving from the network node a first broadcast message protected by a signature, the signature being configured to be generated from at least a protected part of the first broadcast message using a first private key, the first private key being associated with the first public key, the protected part of the first broadcast message comprising a pseudo random number; and
    verifying the first broadcast message using the first public key.

4. The wireless device according to claim 3, wherein the wireless device is further configured to obtain the first public key, receive the first broadcast message and verify a second broadcast message when detecting that an OTD of receiving the first broadcast message from the network node exceeds a predetermined range.

5. The wireless device according to claim 3, wherein the wireless device is further configured to obtain the first public key, receive the first broadcast message and verify a second broadcast message when detecting that an OTD of receiving the first broadcast message from the network node exceeds a predetermined range.

* * * * *